(12) United States Patent
Zhu et al.

(10) Patent No.: US 9,183,857 B2
(45) Date of Patent: Nov. 10, 2015

(54) MAGNETIC DEVICES HAVING SHIELDS INCLUDING A NICKEL ALLOY

(71) Applicant: SEAGATE TECHNOLOGY LLC, Cupertino, CA (US)

(72) Inventors: Meng Zhu, Bloomington, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 117 days.

(21) Appl. No.: 13/666,255

(22) Filed: Nov. 1, 2012

(65) Prior Publication Data
US 2014/0120374 A1    May 1, 2014

(51) Int. Cl.
*G11B 5/11* (2006.01)
*G11B 5/39* (2006.01)
*G11B 5/31* (2006.01)

(52) U.S. Cl.
CPC .............. *G11B 5/3906* (2013.01); *G11B 5/11* (2013.01); *G11B 5/3912* (2013.01); *G11B 5/3146* (2013.01); *Y10T 428/115* (2015.01); *Y10T 428/1121* (2015.01); *Y10T 428/1129* (2015.01)

(58) Field of Classification Search
None
See application file for complete search history.

(56) References Cited

U.S. PATENT DOCUMENTS

| | | | |
|---|---|---|---|
| 5,959,813 A | 9/1999 | Watanabe | |
| 6,376,108 B1 | 4/2002 | Otagiri | |
| 6,393,692 B1 * | 5/2002 | Ju et al. | 29/603.14 |
| 6,456,467 B1 * | 9/2002 | Mao et al. | 360/319 |
| 6,524,491 B1 * | 2/2003 | Liu et al. | 216/22 |
| 7,092,208 B2 | 8/2006 | Zou | |
| 7,170,720 B2 * | 1/2007 | Lin et al. | 360/319 |
| 8,743,507 B1 * | 6/2014 | Hassan et al. | 360/125.3 |
| 8,867,175 B1 * | 10/2014 | Lu et al. | 360/319 |
| 8,921,126 B2 * | 12/2014 | Quan et al. | 438/3 |
| 2009/0174968 A1 | 7/2009 | Singleton | |
| 2009/0207534 A1 * | 8/2009 | Miyauchi et al. | 360/324.11 |
| 2011/0007425 A1 * | 1/2011 | Vas'ko et al. | 360/313 |
| 2011/0007427 A1 | 1/2011 | Qiu | |
| 2012/0280773 A1 * | 11/2012 | Singleton et al. | 335/301 |
| 2013/0293225 A1 * | 11/2013 | Singleton et al. | 324/252 |

FOREIGN PATENT DOCUMENTS

JP      2000-099929     4/2000
WO    WO 2012/082998   6/2012

OTHER PUBLICATIONS

Ikeda, S., et al., "Tunnel Magnetoresistance of 604% at 300K by Suppression of Ta Diffusion in CoFeB/MgO/CoFeB Pseudo-Spin-Valves Annealed at High Temperature", *App. Phys. Letters,* 93, 082508 (2008).

Furubayashi, T. et al., "Structure and Transport Properties of Current-Perpendicular-to-Plane Spin Valves Using Co2FeA10.5Si0.5 and Co2MnSi Heusler Alloy Electrodes", *Journal of Applied Physics,* 107, 113917 (2010).

(Continued)

*Primary Examiner* — Kevin Bernatz
(74) *Attorney, Agent, or Firm* — Mueting, Raasch & Gebhardt, P.A.

(57) ABSTRACT

A device including a magnetoresistive sensor; a top shield; and a bottom shield, wherein the magnetoresistive sensor is positioned between the top shield and the bottom shield, and wherein at least one of the bottom shield and the top shield include NiFeX, wherein X is chosen from Nb, Mo, Ta, or W.

15 Claims, 11 Drawing Sheets

(56) References Cited

OTHER PUBLICATIONS

Ristau, R.A. et al., "On the Relationshp of High Coercivity and L1[sub 0] Ordered Phase in CoPt and FePt Thin Films", *Journal of Applied Physics*, 86, 4527 (1989).

Anderson, R.L., et al., "Annealing Behavoior of Electroplated Permalloy Thin Films", *Electron Mater*, 2, 161 (1973).

Kao, Andrew S. et al., "Effect of Magnetic Annealing on Plated Permalloy and Domain Configurations in Thin-Filming Inductive Head", *IEEE Trans. Mag.*, 81, 27, 4452 (1991).

Pust, Ladislav et al., "Domain Control in Magnetic Shields Using Patterned Permanent Magnet Underlayer", *J. Appl. Phys.* 91, 6940 (2002).

Summary of D2 reference from Korean associate (8 pages), [2014].

\* cited by examiner

MAGNETIC DEVICES HAVING SHIELDS INCLUDING A NICKEL ALLOY

BACKGROUND

Magnetic transducers can include a reader stack positioned between a bottom and top shields. During fabrication of such devices, the materials of the shields have to be subjected to the same processes as the reader stack. Advances in the reader stack can often require different processing techniques, including annealing at higher temperatures. Shields that can be annealed at higher temperatures may therefore be desired.

SUMMARY

Disclosed herein are devices including a magnetoresistive sensor; a top shield; and a bottom shield, wherein the magnetoresistive sensor is positioned between the top shield and the bottom shield, and wherein at least one of the bottom shield and the top shield include NiFeX, wherein X is chosen from Nb, Mo, Ta, or W.

Also disclosed are devices that include a magnetoresistive sensor; a top shield; and a bottom shield, wherein the magnetoresistive sensor is positioned between the top shield and the bottom shield, wherein at least one of the bottom shield and the top shield include NiFeX, wherein X is chosen from Nb, Mo, Ta, or W, and wherein at least the bottom shield and the magnetoresistive sensor were annealed at a temperature of at least about 350° C.

Also disclosed are methods of forming a device, the methods including forming a magnetoresistive sensor stack; forming a precursor bottom shield to form a precursor device, the precursor bottom shield comprising NiFeX, wherein X is chosen from Nb, Mo, Ta, or W; and annealing the precursor device at a temperature of at least about 350° C.

BRIEF DESCRIPTION OF THE DRAWINGS

(FIG. 9A) and 450° C. (FIG. 9B).

(FIG. 10A) and 450° C. (FIG. 10B).

(FIG. 13B), and after a two hour anneal at 450° C. (FIG. 13C).

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
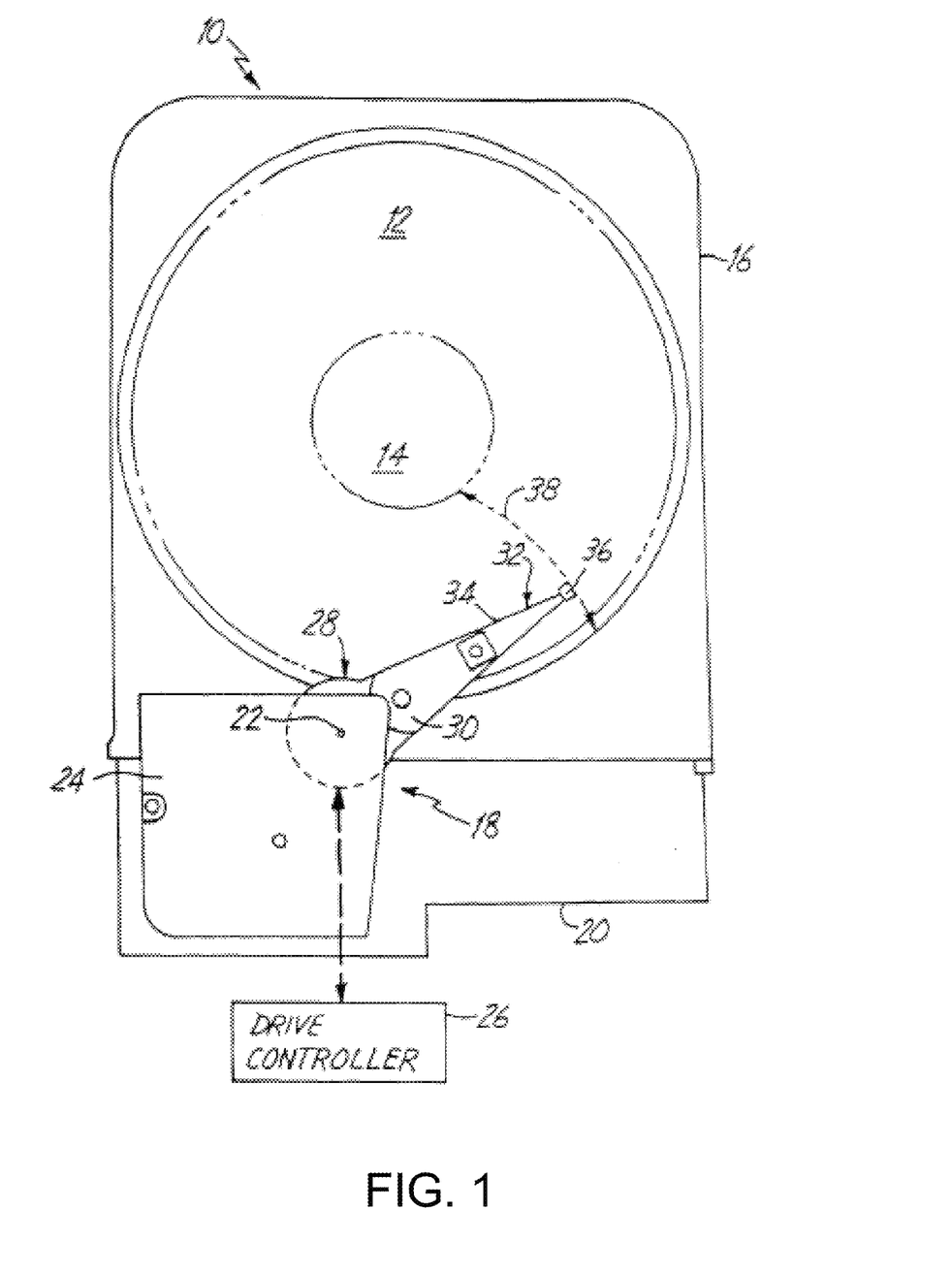
FIG. 1 is a top view of a disc drive system including a magnetoresistive read head.

FIG. 1 is a top view of disc drive system 10 including a disclosed device, or more specifically a magnetoresistive (MR) read head. Disc drive system 10 can include magnetic disc 12 mounted for rotational movement about an axis defined by spindle 14 within housing 16. Disc drive 10 also includes actuator 18 mounted to base plate 20 of housing 16 and pivotally movable relative to disc 14 about axis 22. Cover 24 can cover a portion of actuator 18. Drive controller 26 can be coupled to actuator 18. Drive controller 26 is either mountable within disc drive system 10 or can be located outside of disc drive system 10 with suitable connection to actuator 18. Actuator 18 includes actuator arm assembly 28, a rigid support member 30, and head gimbal assembly 32. Head gimbal assembly 32 includes flexure arm 34 coupled to rigid member 30 and air bearing slider 36 coupled to flexure arm 34 by a gimbal. Slider 36 can support the magnetoresistive transducer or head for reading information from disc 12 and encoding information to disc 12.

During operation, drive controller 26 receives position information indicating a portion of disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This can cause slider 36 to move radially over the surface of disc 12 in a generally arc-like path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 can then execute a desired read or write operation.

Figure 2:
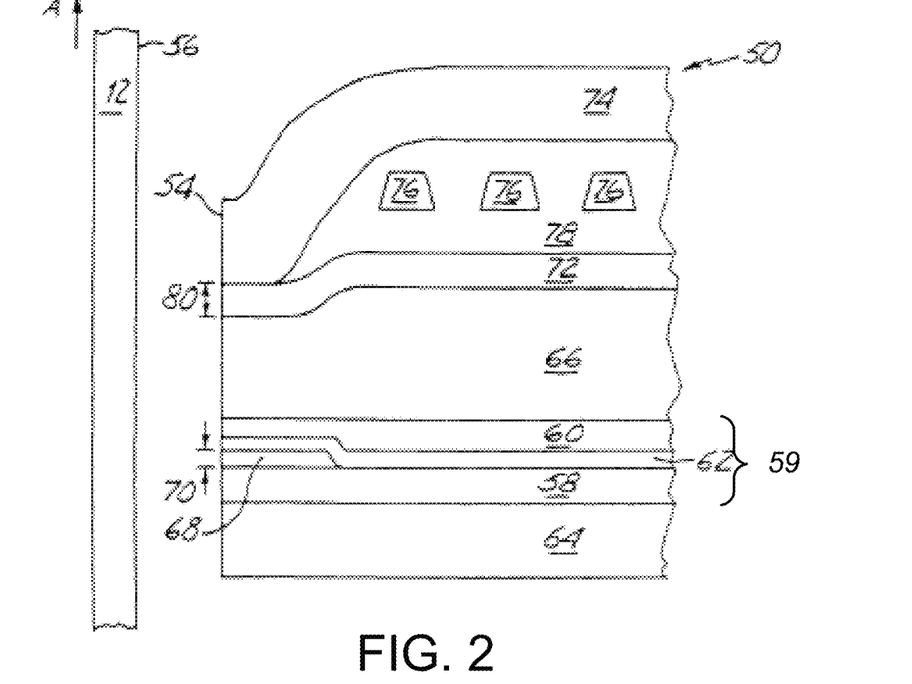
FIG. 2 is a cross-sectional view of a magnetic transducing head and a magnetic disc taken along a plane normal to an air bearing surface of the transducing head.

FIG. 2 is a cross-sectional view of a disclosed device, or magnetic transducing head 50 and magnetic disc 12 taken along a plane normal to air bearing surface 54 of the magnetic transducing head 50. FIG. 2 illustrates magnetic transducing head 50 and its placement relative to magnetic disc 12. Air bearing surface 54 of magnetic transducing head 50 faces disc surface 56 of magnetic disc 12. Magnetic disc 12 travels or rotates in a direction relative to magnetic transducing head 50 as indicated by arrow A. In some embodiments, it is desirable to minimize the spacing between air bearing surface 54 and disc surface 56 while avoiding contact between magnetic transducing head 50 and magnetic disc 12. In most cases, contact between magnetic transducing head 50 and magnetic disc 12 can be detrimental or even destructive to both magnetic transducing head 50 and magnetic disc 12.

A disclosed device can include a magnetoresistive sensor 59, the magnetoresistive sensor can also be referred to as the reader portion. Some embodiments of a magnetoresistive sensor 59 can include a read element 68. Some embodiments of a magnetoresistive sensor can include a bottom gap layer 58, top gap layer 60, metal contact layer 62, and read element 68. Read gap 70 is defined on air bearing surface 54 between terminating ends of bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62.

Disclosed devices can also include a bottom shield 64 and a top shield 66. The top shield 66 can also function as the bottom pole of an associated writer in embodiments where the reader and writer share a pole.

A writer portion of magnetic transducing head 50 includes bottom pole 66 (which in this embodiment also functions as the top shield 66 of the magnetoresistive sensor or reader portion), write gap layer 72, top pole 74, conductive coil 76, and polymer layer 78. Write gap 80 is defined on air bearing surface 54 by write gap layer 72 between terminating ends of top pole 74 and top shield/bottom pole 66. Electrically conductive coils 76 are provided to generate magnetic fields across write gap 80 and are positioned in polymer layer 78 between top pole 74 and write gap layer 72. While FIG. 2 shows a single layer of conductive coils 76, it is understood in the art that several layers of conductive coils may be used separated by several polymer layers. As discussed above, magnetic transducing head 50 is a merged MR head in which top shield/bottom pole 66 is employed both as a top shield in the reader portion and as a bottom pole in the writer portion. If read/write head 50 were a piggyback MR head, top shield/bottom pole 66 would be formed of separate layers.

Figure 3:
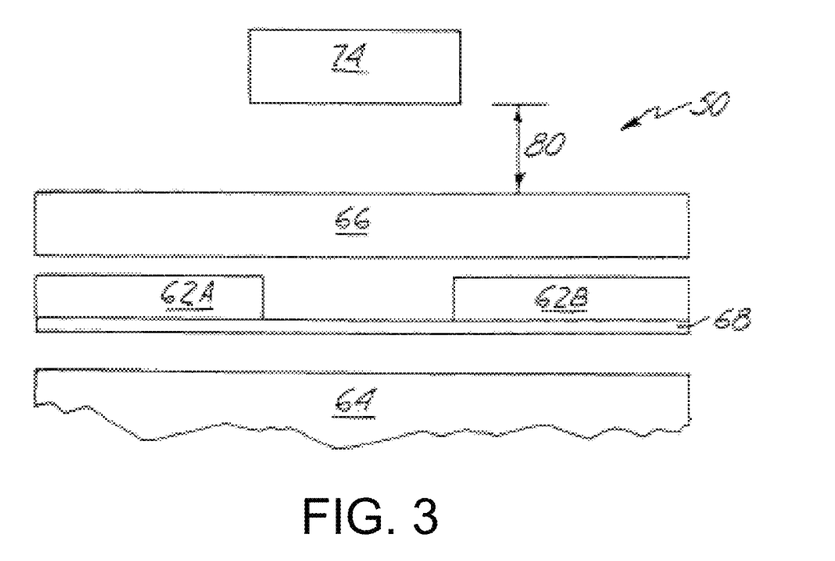
FIG. 3 is a layered diagram illustrating magnetically relevant elements of the magnetic transducing head of FIG. 2.

FIG. 3 is a layered diagram of magnetic transducing head 50. FIG. 3 illustrates the location of a plurality of magnetically relevant elements of magnetic transducing head 50 as they appear along the air bearing surface 54 of magnetic read/write head 50 shown in FIG. 2. In FIG. 3, all spacing and insulating layers are omitted for the sake of clarity. Bottom shield 64 and top shield/bottom pole 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Magnetic flux from the surface of the disc causes rotation of the magnetization vector of a sensing layer or the read element of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary. During a read operation, bottom shield 64 and top shield 66 ensure that read element 68 reads only the information stored directly beneath it on a specific track of magnetic disc 12 by absorbing any stray magnetic fields emanating from adjacent tracks and transitions.

In some embodiments, read element 68 can be a MR element or a giant magnetoresistive (GMR) stack. A MR element can generally be formed of a ferromagnetic material whose resistance fluctuates in response to an external magnetic field, for example from a magnetic medium or disc. GMR sensors can have a series of alternating magnetic and nonmagnetic layers. The resistance of a GMR sensor varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers. Depending on the type and material making up the read element, the device may need to undergo different types of processes.

In some embodiments, the read element can include current-perpendicular-to-plane tunneling magnetoresistance (CPP-TMR) stacks. In some embodiments, such a stack can be a CoFeB/MgO/CoFeB stack. Such a stack can have greatly enhanced properties (for example greatly enhanced TMR) if annealing is undertaken at temperatures greater than 400° C. In some embodiments, the read element can include current-perpendicular-to-plane giant magnetoresistance (CPP-GMR) stacks. In some embodiments, such a stack can be made of a Heusler alloy. GMR sensors made of Heusler alloys have been found to show improved MR signals due to the high polarization of Heusler alloys. In order to achieve the high polarization, the Heusler alloy must be in the ordered $L2_1$ structure. The $L2_1$ structure is generally only established by annealing at temperatures greater than 400° C. In some embodiments, a magnetic transducing head can include a permanent magnet associated with the read element. Such a permanent magnet can provide a biasing field to the read element, which can improve its stability. Permanent magnet materials, such as CoPt or FePt, that are annealed or deposited at higher temperatures, for example up to 500 20 C., can result in a transformation from a disordered face-centered-cubic (fcc) to an ordered $L1_0$ structure. The $L1_0$ structure can greatly improve the coercivity and anisotropy of the permanent magnet materials. In some embodiments, a magnetic transducing head can include an antiferromagnetic (AFM) layer. The AFM layer, such as IrMn can serve to pin one of the ferromagnetic layers in either a GMR or TMR stack through exchange coupling. The exchange biasing of the AFM material is found to improve with high temperature, for example up to 400° C., annealing processes.

Figure 4A:
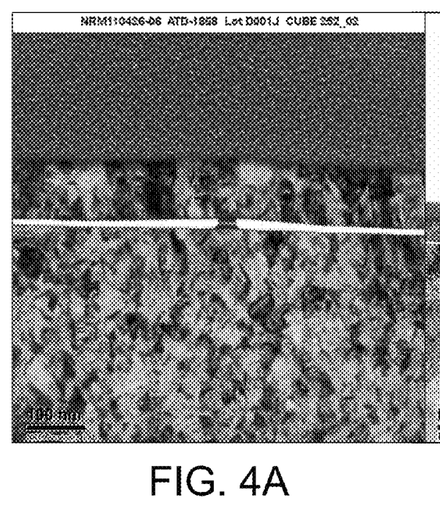
FIGS. 4A and 4B are transmission electron microscopy (TEM) images of a NiFe shield before (FIG. 4A) and after (FIG. 4B) a 10 minute 400° C. rapid-thermal-anneal (RTA) process.
Figure 4B:
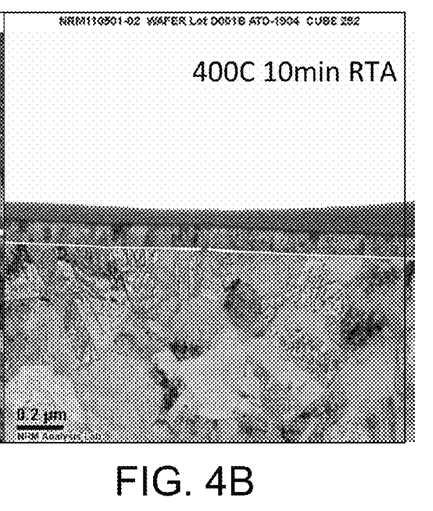
Figure 5A:
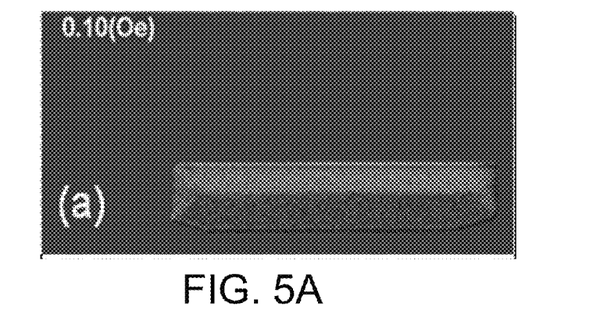
FIGS. 5A and 5B show Kerr microscopy images showing magnetic domain structures of a rectangle-shaped shield at its demagnetization state before (FIG. 5A) and after (FIG. 5B) a 10 minute 400° C. RTA process.
Figure 5B:
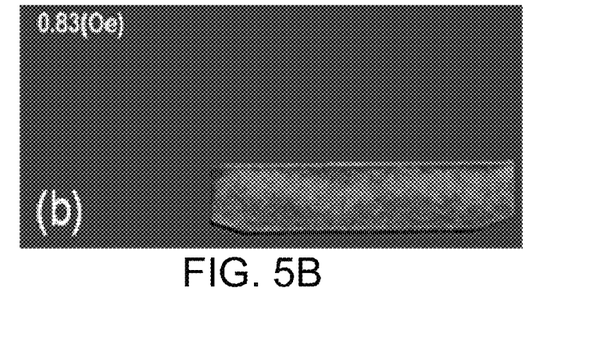

Disclosed herein are devices that include a bottom shield, a top shield, or both that are made of materials that can be processed at temperatures above those typically used. In some embodiments, at least a bottom shield is made of materials that can be processed at temperatures above those typically used. For example, disclosed devices can include bottom shields, top shields, or both made of materials that can be processed at temperatures higher than typical NiFe shields can be processed. Commonly utilized NiFe shields can deteriorate upon annealing at temperatures of 325° to 350° C. Such high temperature annealing of NiFe can result in loss of anisotropy, grain coarsening, and increased inhomogeneity. FIGS. 4A and 4B show transmission electron microscopy (TEM) images of an electroplated NiFe bottom shield before (FIG. 4A) and after (FIG. 4B) a 10 minute 400° C. rapid-thermal-annealing (RTA) process. As seen by comparing the two images; before the high temperature anneal, the film structure displays homogeneous small grains, while after the RTA process, significant grain growth is observed. Similarly, FIGS. 5A and 5B show Kerr microscopy images showing magnetic domain structures of a rectangle-shaped shield at its demagnetization state before (FIG. 5A) and after (FIG. 5B) a 10 minute 400° C. RTA process. It can be seen there that the domain structure shows a Landau flux-closure domain state before the RTA process and no distinct domain boundary can be observed and domains were found to nucleate locally and inhomogeneously after the RTA process. In some embodiments, devices that include disclosed bottom shields, top shields, or both would not undergo the detrimental effects at high temperature anneal conditions.

Disclosed devices can include a bottom shield, a top shield, or both that includes NiFeX, where X is Nb, Mo, Ta, or W. In some embodiments, X is Nb. The amount of X in the NiFeX can be described by the atomic percent (at %) of X in the NiFeX. In some embodiments, the addition of X can decrease the atomic percent of Fe in the NiFeX. In some embodiments, the addition of X can decrease the atomic percent of Ni in the NiFeX. In some embodiments, the addition of X can decrease both the atomic percent of Ni and Fe in the NiFeX.

Figure 6A:
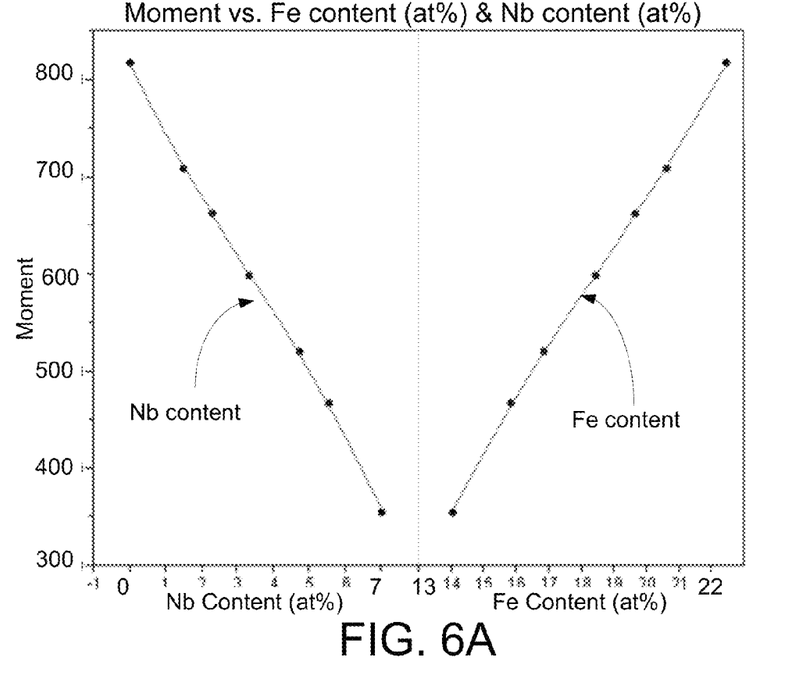
FIGS. 6A, 6B, and 6C are graphs showing the effect of Nb content on the magnetic moment of NiFeNb (FIG. 6A), easy axis coercivity as a function of Nb content at various anneal temperatures (FIG. 6B), and hard axis coercivity as a function of Nb content at various anneal temperatures (FIG. 6C).
Figure 6B:
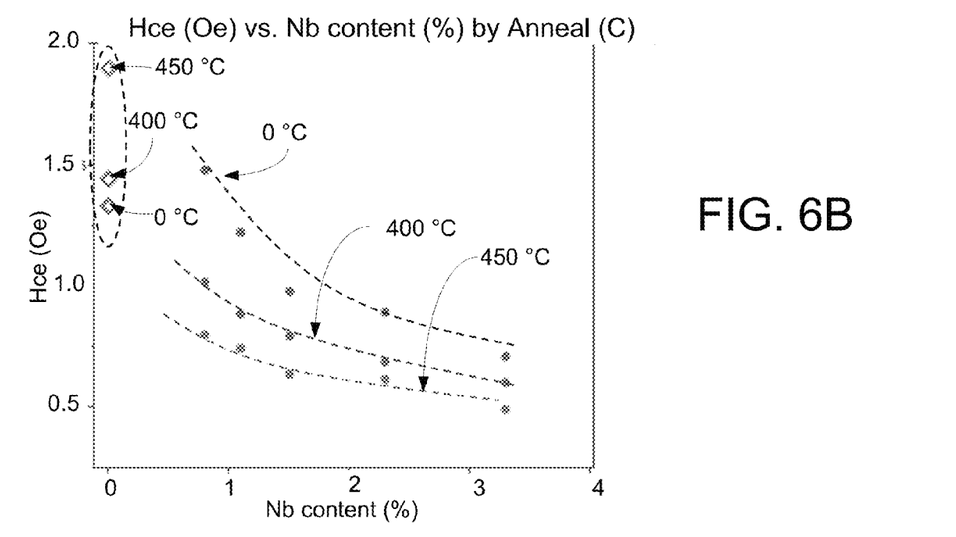
Figure 6C:
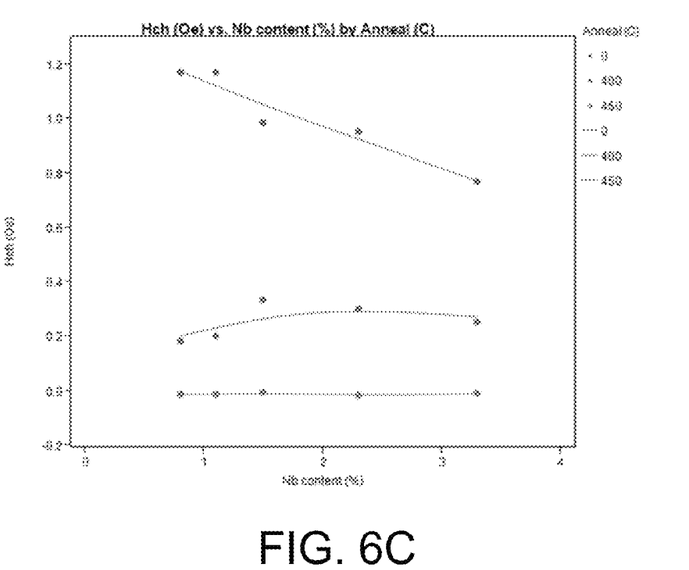

The amount of X in NiFeX affects the magnetic moment of the NiFeX. FIG. 6A shows the effect of the amount of X, in this case, Nb, on the magnetic moment. As seen in FIG. 6A, as the amount of Nb is increased, the magnetic moment decreases. FIG. 6B shows that the easy axis coercivity (Hce) decreases as the Nb content increases with annealing, with the largest changes coming at low levels of Nb. As seen, this is opposite to NiFe, in which Hce increases after annealing. FIG. 6C shows that the hard axis coercivity (Hch) decreases after annealing, and after annealing at 450° C., the hysteresis loop closes for NiFeNb films, while NiFe films show deteriorated loops. Desirable amounts of X in NiFeX can be chosen based on, for example, the observed magnetic properties. In some embodiments, X can be present in NiFeX at an amount of not greater than 7 at %. In some embodiments, X can be present in NiFeX at an amount of not greater than 4 at %. In some embodiments, X can be present in NiFeX at an amount of not greater than 2 at %. In some embodiments, X can be present in NiFeX at 1 at %. In some embodiments, X can be Nb, and the Nb can be present in NiFeNb at an amount of not greater than 7 at %. In some embodiments, X can be Nb, and the Nb can be present in NiFeNb at an amount of not greater than 4 at %. In some embodiments, X can be Nb, and the Nb can be present in NiFeNb at an amount of 2 at %. In some embodiments, X can be Nb, and the Nb can be present in NiFeNb at an amount of 1 at %. A NiFeNb film with 1 at % Nb has the advantage of being able to be annealed at high temperatures and only has about a 5% loss in magnetic moment.

In some embodiments, a disclosed shield can include only NiFeX. In such an embodiment, the shield can include a single layer of NiFeX or multiple layers of only NiFeX. In some embodiments where a shield, such as a bottom shield includes only NiFeX, the shield can have a thickness from 0.1 µm to 2.5 µm. In some embodiments, where a shield, such as a bottom shield includes only NiFeX, the shield can have a thickness from 0.3 µm to 2.5 µm.

It is thought that when X is included in NiFeX, the microstructure of the film is almost entirely, or solely (111) texture, with very little, or no observable (200) texture. Such (200) texture is often seen in both plated and sputtered NiFe films. It is thought, but not relied upon that the absence of (200) texture is a reason for desirable properties, for example the suppression of abnormal grain growth after annealing.

Figure 7:
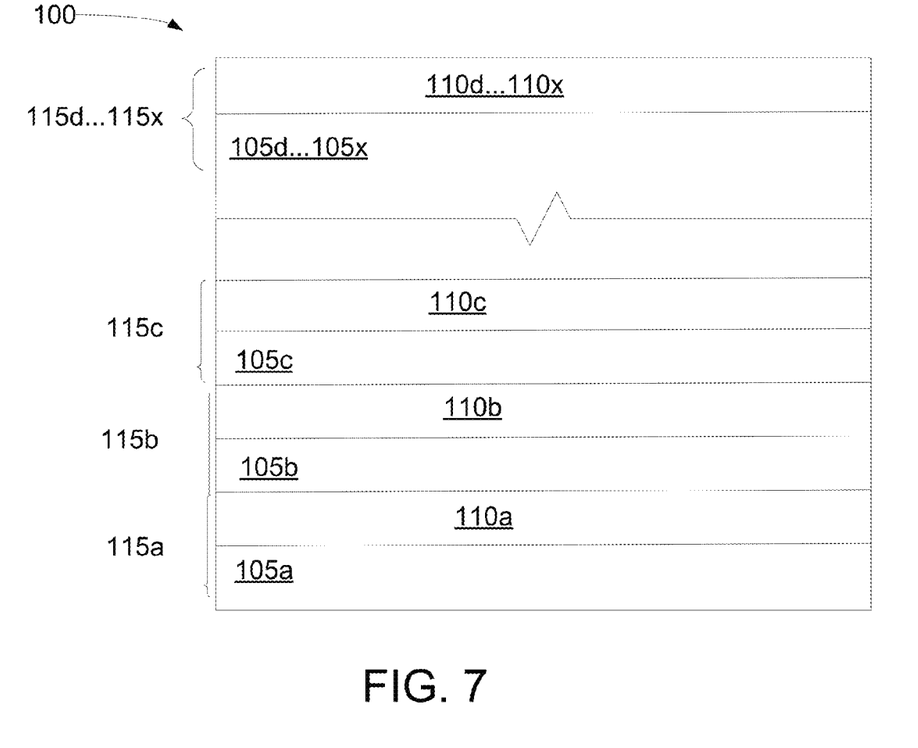
FIG. 7 is a cross-section of an exemplary disclosed shield that includes alternating bilayers.

In some embodiments, a disclosed shield can include alternating layers. An example of such a shield can be seen in FIG. 7. FIG. 7 shows bilayers 115a, 115b, 115c, 115d . . . 115x. Each bilayer, for example first bilayer 115a can include a NiFeX layer 105a and a NiFe layer 110a. In some embodiments, such as that depicted in FIG. 7, a NiFeX layer 105a can be positioned on the bottom of the shield. The NiFeX material of the NiFeX layers 105a, etc. can have characteristics that are the same or similar to those discussed above. The NiFe layers 110a, etc. can include only NiFe, for example. In embodiments where the top shield contains NiFeX bilayers, the most bottom layer, i.e. the layer closest to the read element, can be either NiFeX or NiFe.

In some embodiments that include at least one alternating set of bilayers, a shield can include only one set of bilayers. Such an embodiment can include a NiFeX layer having a thickness that can range from 5 nm to 2.5 µm and a NiFe layer having a thickness that can range from 5 nm to 2.5 µm. In some embodiments, a shield can include more than one set of bilayers. In such embodiments, the NiFeX layers can generally be thinner than the NiFe layers. In some embodiments, the NiFeX layers can have a thickness from 1 nm to 500 nm. In some embodiments, the NiFeX layers can have a thickness from 1 nm to 200 nm. In some embodiments, the NiFeX layers can have a thickness from 5 nm to 50 nm, for example. In some embodiments, the NiFeX layers can have a thickness from 5 nm to 10 nm, for example. In some embodiments, the NiFe layers can have a thickness from 5 nm to 1000 nm. In some embodiments, the NiFe layers can have a thickness from 50 nm to 8000 nm. In some embodiments, the NiFe layers can have a thickness from 100 nm to 500 nm.

The number of bilayers can vary in disclosed shields. In some embodiments, there can be at least four bilayers or stated another way, at least four layers of NiFe and at least four layers of NiFeX. In some embodiments, there can be at least five bilayers or stated another way, at least five layers of NiFe and at least five layers of NiFeX. In some embodiments, there can be at least six bilayers or stated another way, at least six layers of NiFe and at least six layers of NiFeX. In some embodiments, the thickness of the NiFe layers can be related to the number of NiFe layers in the shield. The thickness of the NiFe layers can be inversely proportional to the number of layers of NiFe. This relationship may be due to having more layers of NiFeX present which cause less grain growth to occur in the shield. In some embodiments, the number of bilayers and the thickness of the NiFe and NiFeX layers can be related by the following equation: Total thickness of shield=n*(thickness NiFeNb+thickness NiFe), where n is the number of bilayers. The relationship between the thickness of the NiFe and NiFeX layers can generally depend on the desire to preserve the overall moment, or not. In some embodiments, higher ratios of NiFeNb:NiFe in a fixed bilayer repeat total thickness can imply lower moments and vice versa. The dilution of the magnetic moment can, as in the single layers, depend as well on the percent of Nb in those layers.

In some embodiments, shields including alternating layers of NiFe and NiFeX can decrease the overall percentage of X that is included in the shield. Decreasing the amount of X can decrease the detrimental effect of X on the magnetic properties of the shield. Furthermore, the number of alternating layers, or bilayers, may affect the thermal stability of a shield. As the number of bilayers increase, the magnetic properties may show improved resistance against thermal annealing.

An exemplary method that can be utilized to incorporate NiFeNb containing shields into a device is discussed herein. An adhesion layer, for example a tantalum (Ta) adhesion layer may optionally be utilized in order to promote the adhesion of a sputtered NiFeNb film to a layer underneath the shield layer. Some such embodiments may also include domain control features, for example permanent magnets. In such an embodiment, an adhesion layer (for example a 80 Å Ta adhesion layer) can be deposited before the domain control feature (for example a permanent magnet material, e.g., Cr/CoPt) layer is deposited. Then, the domain control feature (or the layer or layers that will ultimately form the domain control feature) is deposited. Next, a cleaning procedure (for example an argon (Ar) plasma cleaning procedure) can be utilized to remove a portion of the adhesion layer (for example about 20 to 30 Å of an 80 Å Ta adhesion layer) and the domain control feature layer to obtain a fresh, oxidation free surface for NiFeNb deposition. Next, the NiFeNb containing layer or bilayers are deposited. Then, the wafer can be annealed (for example it can be annealed in a vacuum at 400° C. or 450° C. for about two hours in, for example a 1 T magnetic field applied along the easy axis of the film). Such an exemplary method can produce a shield, for example a bottom shield with desirable magnetic properties. The shield can then be patterned into a desired shield shape using, for example, photolithography and ion milling. After patterning, the shield area can be filled with alumina and a chemical mechanical polishing (CMP) process can be carried out to achieve a planarized surface for subsequent processing. Because such a shield has been preconditioned at 450° C. (or 400° C. for example) before CMP, subsequent stack annealing processes at 450° C. or less will not result in increases in roughness. The interfacial roughness of such a sputtered bottom shield and the reader stack can be determined by the CMP process, which is usually around 0.3 nm.

Disclosed shields and shields formed using disclosed methods can have improved thermal stability, meaning that reader stack annealing at high temperatures, for example 400° C. or 450° C., will not result in grain growth and degradation of magnetic properties of the shield. As a result, the reader instability from the interaction of domain nucleation and movement in the bottom shield can be greatly suppressed.

Disclosed shields that utilize NiFeX can also include synthetic antiferromagnetic (SAF) components. In some embodiments SAF elements can be included at the top of a shield (i.e., the portion of the shield in contact with the read element) in order to further stabilize the read element. In some embodiments, a shield that includes NiFeX can also optionally include a SAF structure or portion.

The present disclosure is illustrated by the following examples. It is to be understood that the particular examples, materials, amounts, and procedures are to be interpreted broadly in accordance with the scope and spirit of the invention as set forth herein.

EXAMPLES

Effect of Texture on Thermal Stability

Figure 8A:
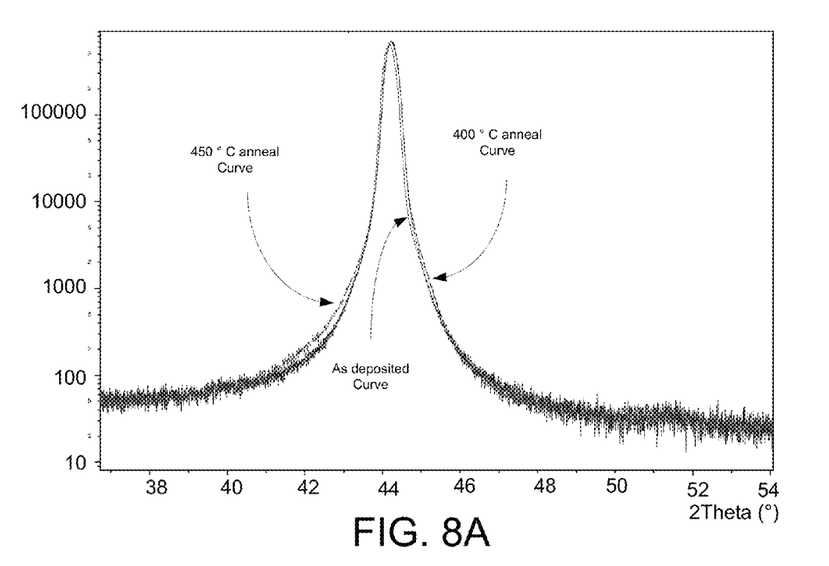
FIGS. 8A, and 8B are XRD spectra of NiFeX (FIG. 8A) and NiFe (FIG. 8B).
Figure 8B:
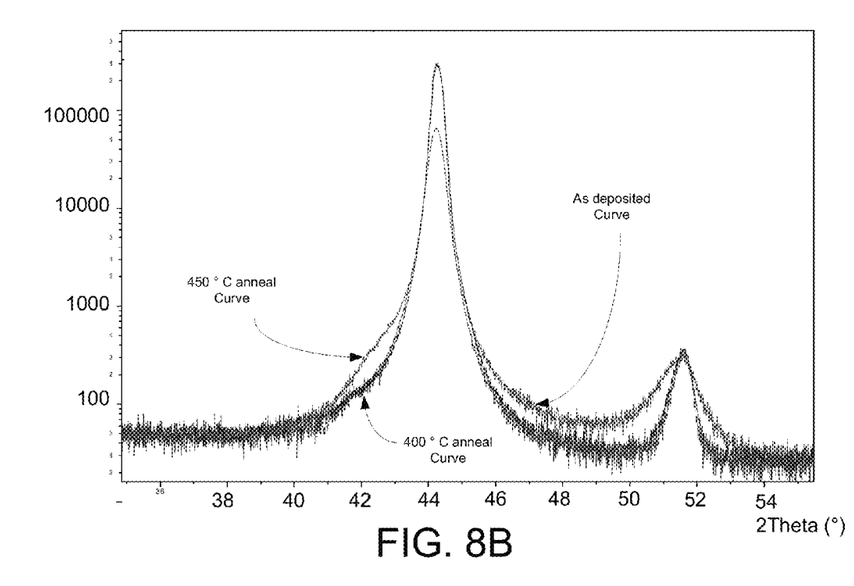

The crystallographic form of a NiFeNb (Nb=1.1 at %) film and a NiFe film were compared. Both films were sputtered at similar argon pressures, and then X-ray diffraction (XRD) spectra were recorded. FIGS. 8A and 8B show the XRD spectra of the NiFeX (FIG. 8A) and the NiFe (FIG. 8B). As seen by a comparison, the as-deposited NiFe film includes both (111) and (200) peaks (the red curve in FIG. 8B), while the as-deposited NiFeNb film only includes a (111) peak (the red curve in FIG. 8A). The NiFeNb also showed very little micro-structural change upon thermal annealing. The XRD spectra after a 400° C. anneal (blue curve in FIG. 8A) and a 450° C. anneal (green curve in FIG. 8A) almost overlap with the as-deposited curve. However, the pure NiFe displays substantial structural change after thermal annealing, as indicated by the increase of (111) texture intensity and the reduction of the full width at half maximum (FWHM) of (111) and (200) peaks. From a grain size analysis using Scherrer's formula, a 35% increase of (111) grain size and a 75% increase of (200) grain size was found for the NiFe film after annealing at 400° C.

Figure 9A:
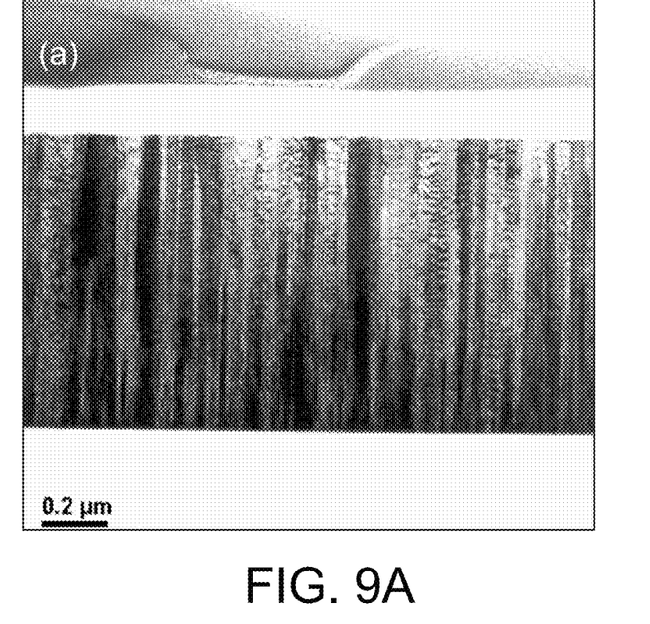
FIGS. 9A and 9B show the cross-sectional grain structure of a 1 μm thick NiFeNb (Nb=3.3 at %) film after two hour anneals at 400° C.
Figure 9B:
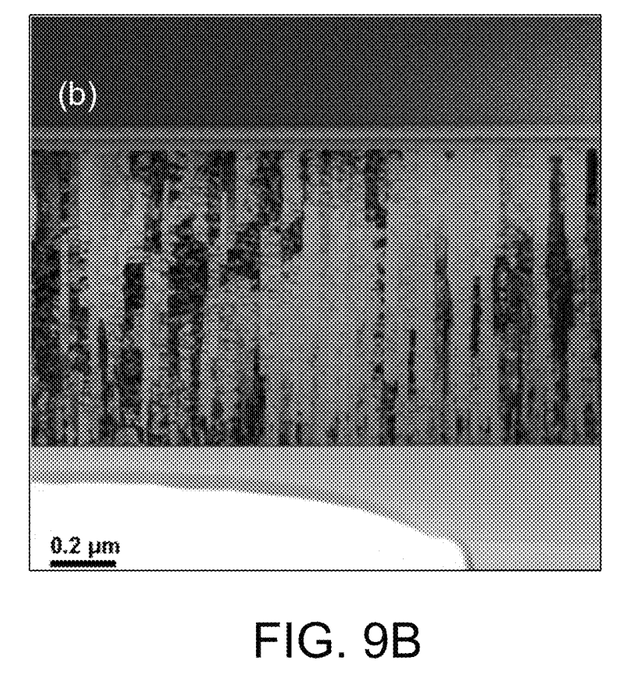
Figure 10A:
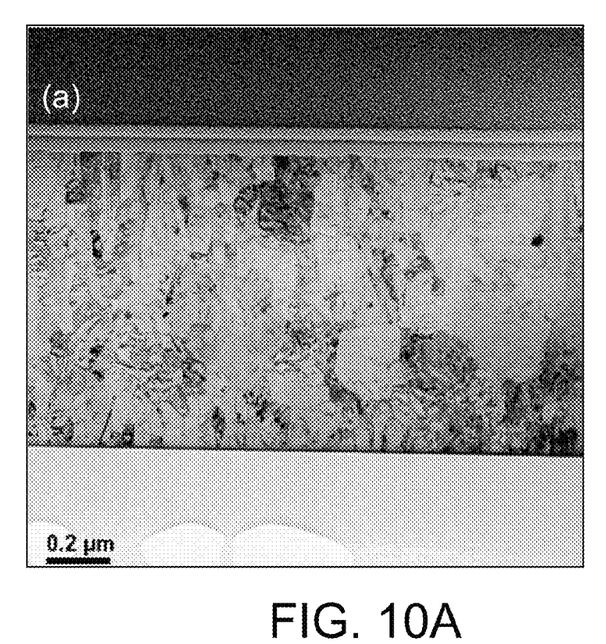
FIGS. 10A and 10B show TEM images of the NiFe after two hour anneals at 400° C.
Figure 10B:
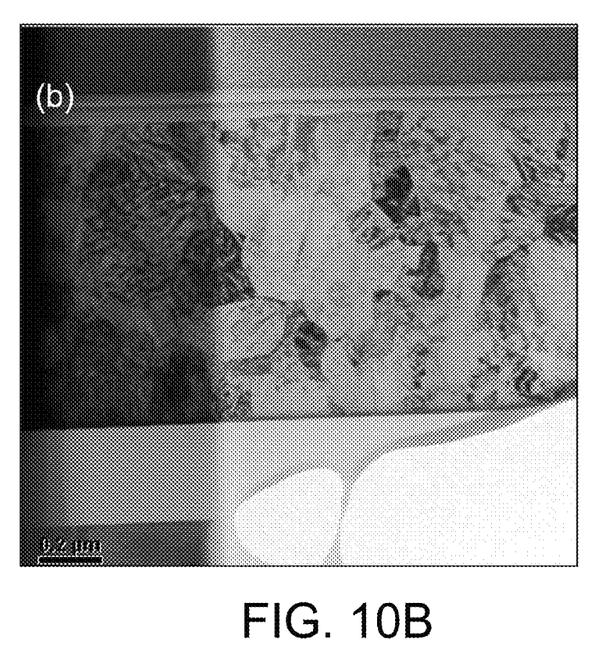

The thermally stable grain structure of NiFeNb was further confirmed using cross-sectional transmission electron microscopy (TEM). FIGS. 9A and 9B show the cross-sectional grain structure of a 1 μm thick NiFeNb (Nb=3.3 at %) film after two hour anneals at 400° C. (FIG. 9A) and 450° C. (FIG. 9B). As seen in FIGS. 9A and 9B, there are virtually no grain structure changes after annealing. On the contrary, the sputtered NiFe films exhibited significant abnormal grain growth after isothermal annealing processes. FIGS. 10A and 10B show TEM images of the NiFe after two hour anneals at 400° C. (FIG. 10A) and 450° C. (FIG. 10B). It is seen there that the grain structure changes from columnar types to random patches of large grains, similar to what is observed in electroplated NiFe films after high temperature annealing.

Figure 11:
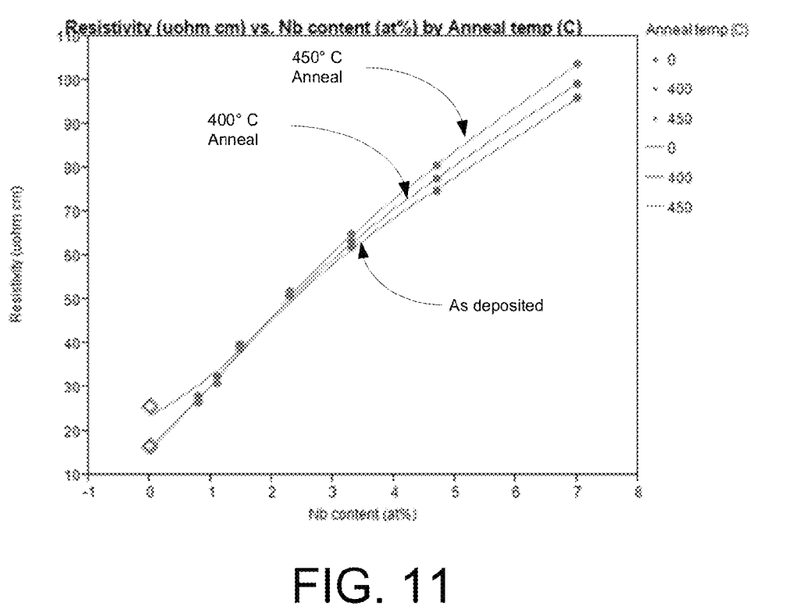
FIG. 11 shows the resistivity as a function of Nb content after 400° C. and 450° C. annealing.

The grain evolution upon thermal annealing can also be manifested by the resistivity change of the film. FIG. 11 shows the change of resistivity after 400° C. and 450° C. annealing of films with different Nb content. From a review of FIG. 11, a cross-over in the trend of resistivity change upon annealing as Nb concentration changes can be seen. High Nb-content films can show an increase of resistivity which may be attributed to increased scattering from the precipitated second phase at the grain boundary. Based on the phase diagram, high Nb concentration may result in a separation of two phases. As the Nb concentration decreases to below 2%, the resistivity shows a slightly decreasing trend, which can be understood as the grain growth and reduction of grain boundary scattering. However, compared to the large decrease of the resistivity of the NiFe film, the resistivity change of NiFeNb (Nb≈1 at %) is negligible, which confirms the stable grain structure of NiFeNb films after annealing.

Characteristics of NiFeNb When Annealed in Magnetic Field

Figure 12A:
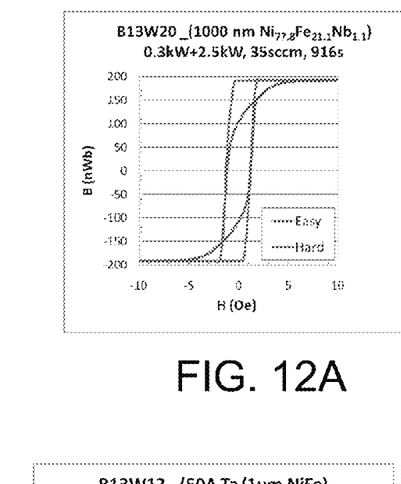
FIGS. 12A, 12B, and 12C show hysteresis loops of a 1.0 μm thick NiFeNb (Nb=1.1 at %) film at different stages of annealing.
Figure 12B:
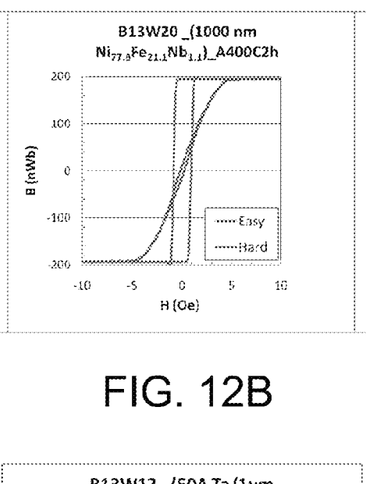
Figure 12C:
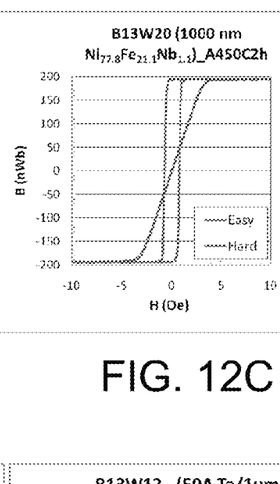

A 1.0 μm thick NiFeNb (Nb=1.1 at %) film was sputtered. A 1 Tesla (T) magnetic field was applied along the easy axis of the films while annealing. FIGS. 12A, 12B, and 12C show hysteresis loops of the film at different stages of annealing. FIG. 12A shows the hysteresis loop of the as-deposited film. A large opening of the hard-axis loop can be seen. This may be due to large magnetic dispersions developed during the film deposition. FIGS. 12B and 12C show hysteresis loops after two hours at 400° C. anneal (FIG. 12B) and two hours at 450° C. anneal (FIG. 12C). From a comparison, it can be seen that the film properties are significantly improved after thermal treatment. After a 450° C. anneal, the easy-axis coercivity is as a low as 0.75 Oe and the hard-axis loop shows a linear response indicating well defined anisotropy and very low magnetic dispersion in the film.

The coercivity of a NiFeNb film as a function of Nb content is shown in FIG. 6. Increasing Nb content is seen to soften the film by reducing the easy axis coercivity of the film. Annealing at 400° C. and 450° C. also further reduces the coercivity of the NiFeNb films. On the other hand, a NiFe film shows an opposite trend with a drastic increase in coercivity, indicating deterioration of its soft magnetic properties from abnormal grain growth.

Figure 13A:
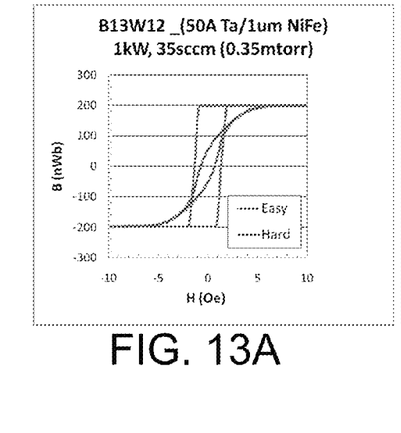
FIGS. 13A, 13B, and 13C show hysteresis loops of NiFe sheet films sputtered at similar conditions as deposited (FIG. 13A), after a two hour anneal at 400° C.
Figure 13B:
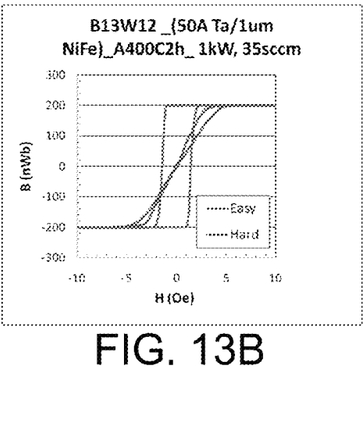
Figure 13C:
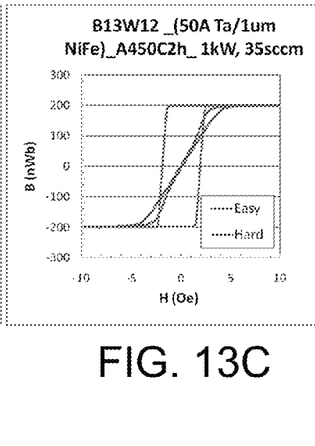

For comparison, FIGS. 13A, 13B, and 13C show hysteresis loops of NiFe sheet films sputtered at similar conditions as deposited (FIG. 13A), after a two hour anneal at 400° C. (FIG. 13B), and after a two hour anneal at 450° C. (FIG. 13C). As seen there, there is a rapid increase of coercivity and a distorted hard axis loop after a two hour anneal at 400° C., indicating degradation of film properties. This observation correlates well with the TEM analysis in FIGS. 10A and 10B, which indicates significant grain growth in sputtered NiFe films after high temperature annealing.

Thermal Stability as a Function of Bilayer Number

Figure 14A:
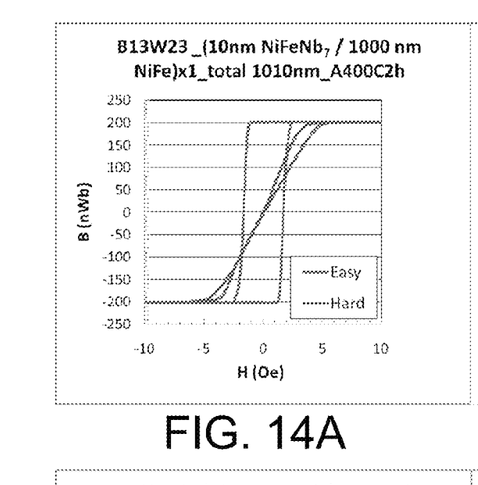
FIGS. 14A, 14B, 14C, 14D, 14E, and 14F show hysteresis loops after a 400° C. two hour anneal for one bilayer (FIG. 14A), two bilayers (FIG. 14B), and six bilayers (FIG. 14C); and a 450° C. two hour anneal for one bilayer (FIG. 14D), two bilayers (FIG. 14E), and six bilayers (FIG. 14F).
Figure 14B:
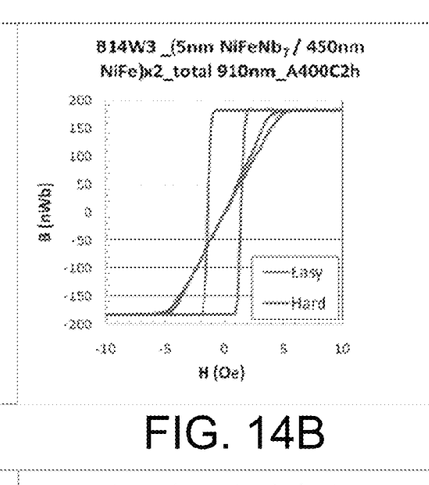
Figure 14C:
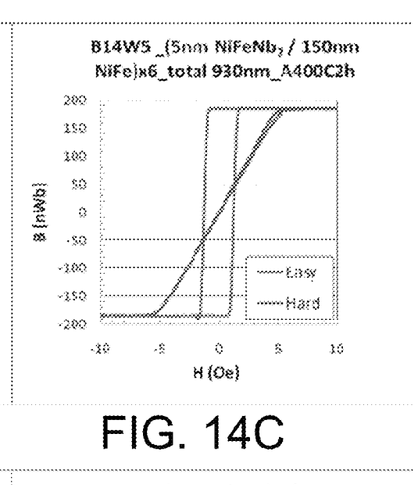
Figure 14D:
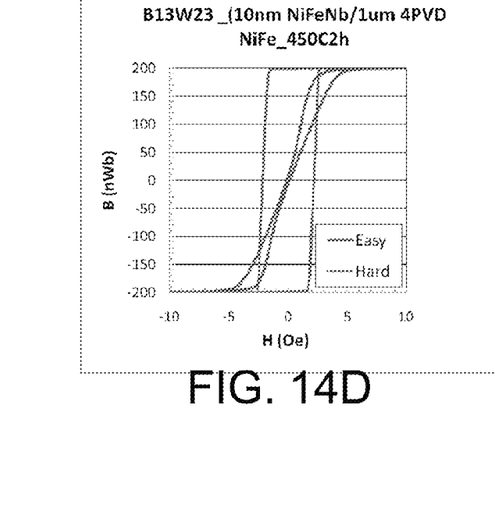
Figure 14E:
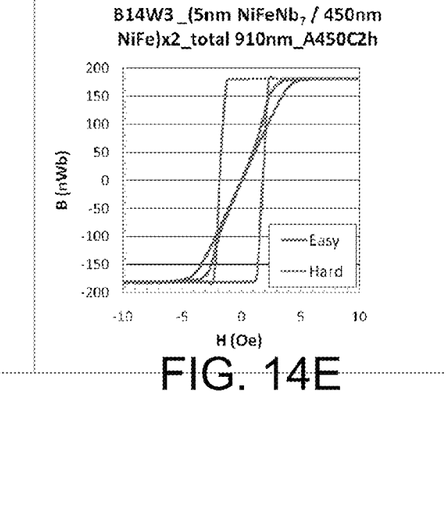
Figure 14F:
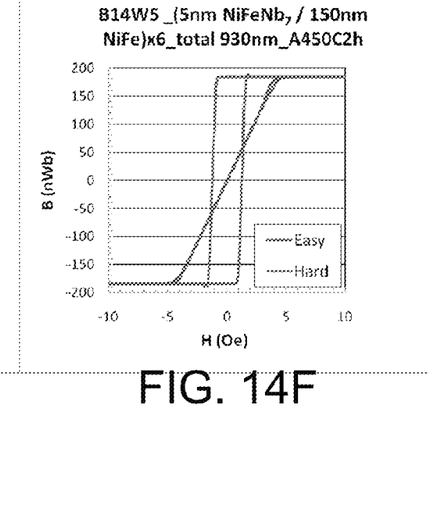

In configurations that include alternating layers of NiFe and NiFeX, the number of bilayers was shown to affect the thermal stability. FIGS. 14A, 14B, 14C, 14D, 14E, and 14F show hysteresis loops after a 400° C. two hour anneal for one bilayer (FIG. 14A), two bilayers (FIG. 14B), and six bilayers (FIG. 14C); and a 450° C. two hour anneal for one bilayer (FIG. 14D), two bilayers (FIG. 14E), and six bilayers (FIG. 14F). As shown in FIGS. 14A and 14D, the film with one bilayer of 10 nm NiFeNb/1000 nm NiFe displays degrading film properties similar to those seen in the pure 1000 nm NiFe film after 400° C. and 450° C. anneal (FIGS. 14B and 14C). As the number of bilayers increase, the magnetic properties show improved resistance against thermal annealing. FIGS. 14B and 14E show the hysteresis loops of the film with two bilayers of 5 nm NiFeNb/450 nm NiFe; and FIGS. 14C and 14F show the hysteresis loops of the film with six bilayers of 5 nm NiFeNb/150 nm NiFe. It can be seen that once six (6) bilayers are utilized, the coercivity of the film does not increase upon 450° C. annealing and the hard-axis loop remains close and linear.

Figure 15:
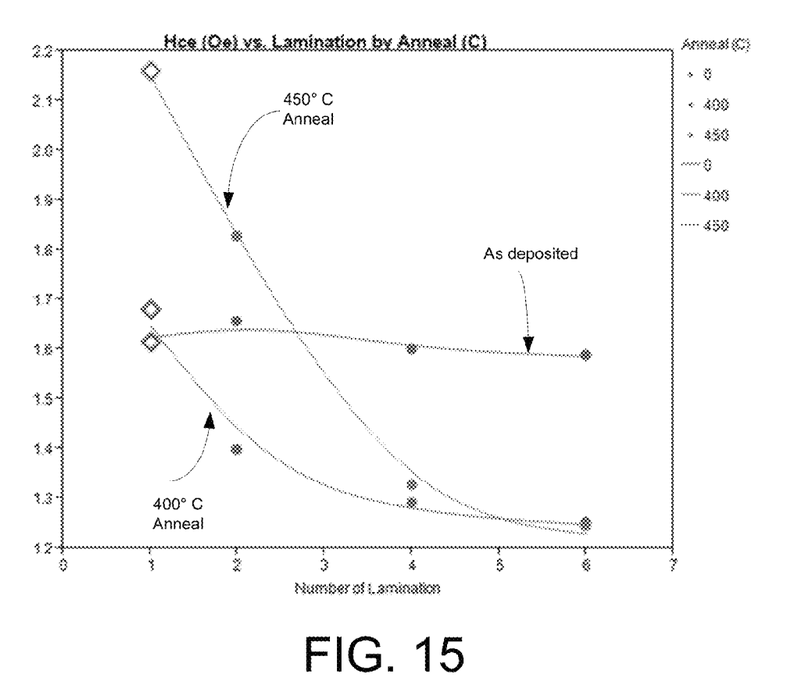
FIG. 15 shows the coercivity of a NiFeNb/NiFe bilayer film as a function of the number of laminations for an as-deposited film, after 400° C. anneal, and after a 450° C. anneal.

FIG. 15 shows the coercivity of a NiFeNb/NiFe bilayer film as a function of the number of laminations for an as-deposited film, after 400° C. anneal, and after a 450° C. anneal. The coercivities of a single NiFe film with a NiFeNb seed are shown in the diamond symbols for the sake of comparison. The single layer of NiFe with NiFeNb seed shows monotonically increases of coercivity as annealing temperature increases. When using at least two bilayers, the coercivity is reduced after 400° C. annealing, but increases again after 450° C. annealing. It is shown that for 400° C. annealing conditions, a multilayer repetition of at least four can achieve stable, soft magnetic properties. However, for 450° C. annealing, a multilayer repetition of at least six can achieve, stable, soft magnetic properties. It can also be seen from this figure that by adjusting the number of bilayers while keeping the total thickness of the shield the same, the thermal stability of the shield can be tuned to accommodate desired annealing conditions.

Thus, embodiments of magnetic devices having shields including a nickel alloy are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
 a magnetoresistive sensor;
 a top shield; and
 a bottom shield,
 wherein the magnetoresistive sensor is positioned between the top shield and the bottom shield, and wherein at least one of the bottom shield and the top shield comprise NiFeX, wherein X is Nb and the Nb is present at an amount not less than about 1 atomic percent and not greater than about 4 atomic percent.

2. The device according to claim 1, wherein the bottom shield comprises NiFeX.

3. The device according to claim 1, wherein at least one of the bottom shield and the top shield consist essentially of NiFeX, wherein X is W.

4. The device according to claim 3, wherein the bottom shield has a thickness from about 0.3 μm to about 2.5 μm.

5. The device according to claim 1, wherein the bottom shield comprises alternating layers of NiFe and NiFeX, wherein X is W.

6. The device according to claim 5, wherein the NiFeX layers have thicknesses from about 5 nm to about 10 nm.

7. The device according to claim 5, wherein there are at least 4 layers of NiFe and at least 4 layers of NiFeX.

8. The device according to claim 1, wherein the device further comprises a domain control feature positioned between the magnetoresistive sensor and the bottom shield.

9. The device according to claim 1, wherein at least the bottom shield or the top shield, or both further comprise a synthetic antiferromagnetic portion.

10. A device comprising:
 a magnetoresistive sensor;
 a top shield; and
 a bottom shield,
 wherein the magnetoresistive sensor is positioned between the top shield and the bottom shield, wherein at least one of the bottom shield and the top shield comprise NiFeX, wherein X is Nb and the Nb is present at an amount not less than about 1 atomic percent and not greater than about 4 atomic percent, and wherein at least the bottom shield and the magnetoresistive sensor were annealed at a temperature of at least about 350° C.

11. The device according to claim 10, wherein the bottom shield comprises alternating layers of NiFe and NiFeX, wherein X is W.

12. The device according to claim 11, wherein there are at least 4 layers of NiFe and at least 4 layers of NiFeX.

13. A method of forming a device, the method comprising:
 forming a magnetoresistive sensor stack;

forming a precursor bottom shield to form a precursor device, the precursor bottom shield comprising NiFeX, wherein X is Nb and the Nb is present at an amount not less than about 1 atomic percent and not greater than about 4 atomic percent; and
annealing the precursor device at a temperature of at least about 350° C.

14. The method according to claim 13, wherein forming the precursor bottom shield comprises forming a stack comprising alternating layers of NiFeX and NiFe.

15. The method according to claim 13, wherein the annealing is undertaking at a temperature of at least about 400° C.

* * * * *